(12) United States Patent
McKye et al.

(10) Patent No.: US 10,330,173 B1
(45) Date of Patent: Jun. 25, 2019

(54) LANYARD STRAP AND LINK DEVICE FOR DISPLAYING NAME TAGS

(71) Applicants: Barbara K McKye, Fenton, MO (US); Brent James, St. Louis, MO (US)

(72) Inventors: Barbara K McKye, Fenton, MO (US); Brent James, St. Louis, MO (US)

(73) Assignee: Technical Sales and Services, Inc, Fenton, MO (US)

( * ) Notice: Subject to any disclaimer, the term of this patent is extended or adjusted under 35 U.S.C. 154(b) by 0 days.

(21) Appl. No.: 15/998,385

(22) Filed: Aug. 14, 2018

(51) Int. Cl.
*F16G 11/02* (2006.01)
*F16G 11/04* (2006.01)
*A45C 13/10* (2006.01)
*A45F 5/00* (2006.01)
*A45F 3/00* (2006.01)

(52) U.S. Cl.
CPC ........ *F16G 11/044* (2013.01); *A45C 13/1076* (2013.01); *A45F 5/00* (2013.01); *A45F 2003/002* (2013.01); *A45F 2005/006* (2013.01)

(58) Field of Classification Search
CPC .... F16G 11/02; F16G 11/044; A45C 13/1076; A45F 5/00; A45F 2003/002; A45F 2005/006
See application file for complete search history.

(56) References Cited

U.S. PATENT DOCUMENTS

| 1,363,709 | A | | 12/1920 | Bernier | |
| 2,548,104 | A | | 4/1951 | Frison | |
| 5,027,477 | A | * | 7/1991 | Seron | A44B 11/2584 |
| | | | | | 119/865 |
| 5,669,119 | A | * | 9/1997 | Seron | F16G 11/101 |
| | | | | | 24/115 H |
| 5,689,860 | A | * | 11/1997 | Matoba | F16G 11/101 |
| | | | | | 24/115 F |
| 5,979,095 | A | * | 11/1999 | Schneider | G09F 3/005 |
| | | | | | 24/704.1 |
| 6,598,273 | B2 | | 7/2003 | Buettell | |
| 6,675,446 | B2 | | 1/2004 | Buettell | |
| 6,684,462 | B1 | * | 2/2004 | Narula | A44B 11/02 |
| | | | | | 24/115 R |
| 6,691,904 | B2 | * | 2/2004 | Pineda | A45F 5/02 |
| | | | | | 223/81 |
| 6,711,785 | B1 | * | 3/2004 | Hicks | A44B 11/006 |
| | | | | | 24/3.1 |
| 6,725,506 | B1 | | 4/2004 | Anscher | |
| 7,013,535 | B2 | * | 3/2006 | Tracy | A44B 99/00 |
| | | | | | 24/115 H |
| 8,001,710 | B2 | * | 8/2011 | McKye | G09F 3/207 |
| | | | | | 24/3.4 |
| 8,756,771 | B1 | | 6/2014 | Moreau et al. | |
| 8,757,532 | B2 | | 6/2014 | Votel et al. | |
| D730,986 | S | | 6/2015 | Moreau et al. | |
| 9,087,461 | B2 | | 7/2015 | McKye | |
| D741,213 | S | | 10/2015 | Moreau et al. | |

(Continued)

*Primary Examiner* — Gary C Hoge
(74) *Attorney, Agent, or Firm* — Paul M Denk

(57) ABSTRACT

A lanyard strap, link device, for displaying the name of a person, including an envelope, a lanyard, and an integral clamp formed of a lateral tab, and an integral vertical tab, which when folded into closure, provide for securement of the lanyard strap to its envelope for display of the personal badge of the user. The components of the lanyard, link, and envelope, may or may not be formed of biodegradable components.

9 Claims, 2 Drawing Sheets

(56) References Cited

U.S. PATENT DOCUMENTS

| | | | |
|---|---|---|---|
| 2010/0032462 A1* | 2/2010 | Cameron | A45C 11/00 224/222 |
| 2018/0014626 A1* | 1/2018 | Tang | A45F 5/00 |
| 2018/0020813 A1* | 1/2018 | Pollack | A45F 5/00 224/272 |

* cited by examiner

LANYARD STRAP AND LINK DEVICE FOR DISPLAYING NAME TAGS

FIELD OF INVENTION

This invention relates to a lanyard strap and link device for displaying the name and other indicia of a person temporarily about the body of a person, and more specifically relates to a lanyard strap, its link or its clip, and a badge holder, wherein the link is fabricated as a one piece device, having foldable characteristics, which when folded provides means for securing the ends of the lanyard strap in place, while the other foldable component can secure to the envelope that supports the name tag in position, during its usage and application. While this definition of the device provides an overall description of its characteristics, it is a displaying means, and it is one that may also be biodegradable, or at least parts of it, so as to break down in the environment, after usage and disposal.

BACKGROUND OF THE INVENTION

This invention relates to a lanyard strap and link for use for holding an envelope that displays the name and other indicia of its user.

Numerous types of name tags have been developed in the prior art, and the assignee of the applicant herein, possesses a couple of patents upon a biodegradable type of badge, U.S. Pat. Nos. 9,087,461, and 8,001,710, both of which show various style of clamps, for securing with a lanyard, and which attach with the foldable sheet forming an envelope for holding the name badge of the user. In one instance, the badge incorporates a pair of to such clamps, while in the second patent a singular clamp is presented proximate the center of the foldable envelope, to secure it to its lanyard, and thence to the person of the user. Both of these previously patented badges are formed of various biodegradable materials, including biodegradable polymers, that form at least the clamp, and the envelope, of their shown structures.

Other prior art lanyards can be seen in U.S. Pat. No. 5,669,119, upon a cord lanyard, which shows its integral link, that does have locking indentations and clamping hooks, that hold the ends of the cord in place.

U.S. Pat. No. 6,711,785, shows another lanyard connector and system. This device comprises a connector having a male buckle portion and a female buckle portion, the ends of the lanyard being secured with the female portion, while the male buckle portion can receive an attachment thereon, for securement, apparently, of an envelope thereto.

The patent to Bernier, U.S. Pat. No. 1,363,709, shows a snap fastener, formed as a one piece snap fastener, which is used just for that purpose, as a fastener, itself.

The United States patent to Frison, U.S. Pat. No. 2,548,104, shows a tag and card holder, and which shows how the tag can be impaled onto its envelope, to secure it in position.

There are many other lanyard type of connecting devices, but they are far more complex structured, as can be noted in U.S. Pat. Nos. D741,213, D730,986, the retractable lanyard of U.S. Pat. No. 8,757,532, the locking link assembly of U.S. Pat. No. 8,756,771, the badge lanyard shown in U.S. Pat. No. 6,691,904, the attachable neck lanyard slider as shown in U.S. Pat. No. 6,675,446, a complex lanyard buckle connector as shown in U.S. Pat. No. 6,598,273, the published application No. US 2006/0250254, and the tag keeper as shown in U.S. Pat. No. 6,725,506. These are examples of different styles of lanyard holders and various links.

SUMMARY OF THE INVENTION

This invention contemplates a lanyard strap and link device that is made of lesser componentry, wherein the link is formed as a one piece item, that can be easily manipulated and folded to both hold the lanyard ends in place, and secure about the upper edge of the accompanying name tag envelope, wherein the link components are fabricated from polymer materials that are approximately 25 to 40 thousands of an inch in thickness, so they can be easily folded when manipulated into their gripping positions, for securement of their lanyard, and its name tag holding envelope in place. In addition, the various components of the lanyard, the link, and even the envelope, may be fabricated from biodegradable materials, either of cloth or polymer, which when they are disposed of, will break down in the environment, and lessen the potential for environmental detriment, when a large number of these devices are disposed of, as frequently occurs, after a meeting, convention, or the like.

More specifically, the formed link is made of a pair of tabs, the first tab extending laterally, and having a fold line at its potential midpoint, generally formed as a living hinge, so that the lateral tab may be folded over, and hold the ends of a lanyard, or a portion of the lanyard, in place, once secured therein during the closure of the said lateral tab during its assembly. A vertical tab secures, integrally, and is molded with it, extending downwardly from the approximate midpoint of either half of the lateral tab, so that when the lateral tab is folded into closure, the vertical tab will be at its approximate midpoint, and the vertical tab likewise can be folded over, about its living hinge, and snapped into position for closure, once it is secured through the upper slot of the name tag envelope, that accompanies the assembled device or badge.

The lateral tab may include a series of prongs, that extends upwardly from the inner surface of the lateral tab, and each prong is aligned with an aperture through the other part of the lateral tab, so as to assure that when the lanyard is located therein, and the lateral tab is folded over into closure, and snapped fastened by its fastener, the lanyard will be secured in position, and can not be removed, because the prongs not only extend through the lanyard, or its ends, but partially into the apertures of the aligned other half of the lateral tab, to impale the lanyard in position, and to prevent its unauthorized removal, throughout the duration of its usage.

The vertical tab also has its living hinge, formed at its approximate midpoint, and it includes a pressure fit of a fastener, together, so that when the vertical tab is partially inserted through a slot in the approximate upper portion of the accompanying name tag envelope, its fastener will lock into position, and secure the envelope, and its name tag, in position, and prevent its unauthorized release, throughout the longevity of its usage, when functioning as a name and to other indicia tag for the user, during application.

As previously referred to, select of the polymers forming the link device are formulated from polymers that may be biodegradable in their usage and application, and reference is made to the accompanying patents of the assignee herein, U.S. Pat. Nos. 8,001,710, and 9,087,461, which are incorporated herein by reference in order to furnish an analysis of the formulation of such polymers, molded into the link device of this invention.

It is likewise, furthermore, within the subject matter of this invention that the lanyard strap may be formed of a cloth, such as cotton or even of biodegradable polymers, that will break down in the environment, when disposed of. Furthermore, the envelope forming the name tag holder may also be formed of biodegradable polymers, as referred to and explained in said earlier patents of the assignee herein.

It is, therefore, the principal object of this invention to provide a lanyard strap, a link device, for securing with the envelope that holds and displays the name and other indicia of the user of the name tag during its application.

A further object of this invention is to provide a one piece manipulable link that is easily foldable about itself, for both locking onto and securing the ends or a portion of its accompanying lanyard, and likewise, can secure onto the proximate upper edge of the envelope that holds the name tag in place.

Another object of this invention is to provide the link device of this invention that is very inexpensive of manufacture, can be made of biodegradable polymer materials, and is substantially of lesser cost than the complex types of clamps that are currently used, and shown in the prior art, for these types of applications.

Yet another object of this invention is to provide a clamp device that is formed of a lateral tab, that is foldable about itself, and can generally be manipulated and locked into position about the lanyard through a single handed usage.

A further object of this invention is to provide an integral vertical tab, that extends down from the approximate midpoint of one of the halves of the lateral tab, to be essentially centered therewith, while the vertical tab likewise can be one handed folded over, locked into position through a slot in the approximate upper edge of the accompanying envelope, that secures and holds the name tag of the user in place.

Yet another object of this invention is to provide a one piece clamp that can be polymer molded from a thin material, to provide for ease of its manipulation and folding, during its preparation for usage.

Another object of this invention is to provide a link device, for holding a lanyard strap and name tag holder, wherein the lateral and vertical tab integrally forming the link each incorporate a living hinge, that greatly facilitates their folding over during assembly.

These and other objects may become more apparent to those skilled in the art upon review of the summary of the invention as provided herein, and upon undertaken a study of the description of its preferred embodiments, in view of the drawings.

DESCRIPTION OF THE PREFERRED EMBODIMENT

Figure 1:
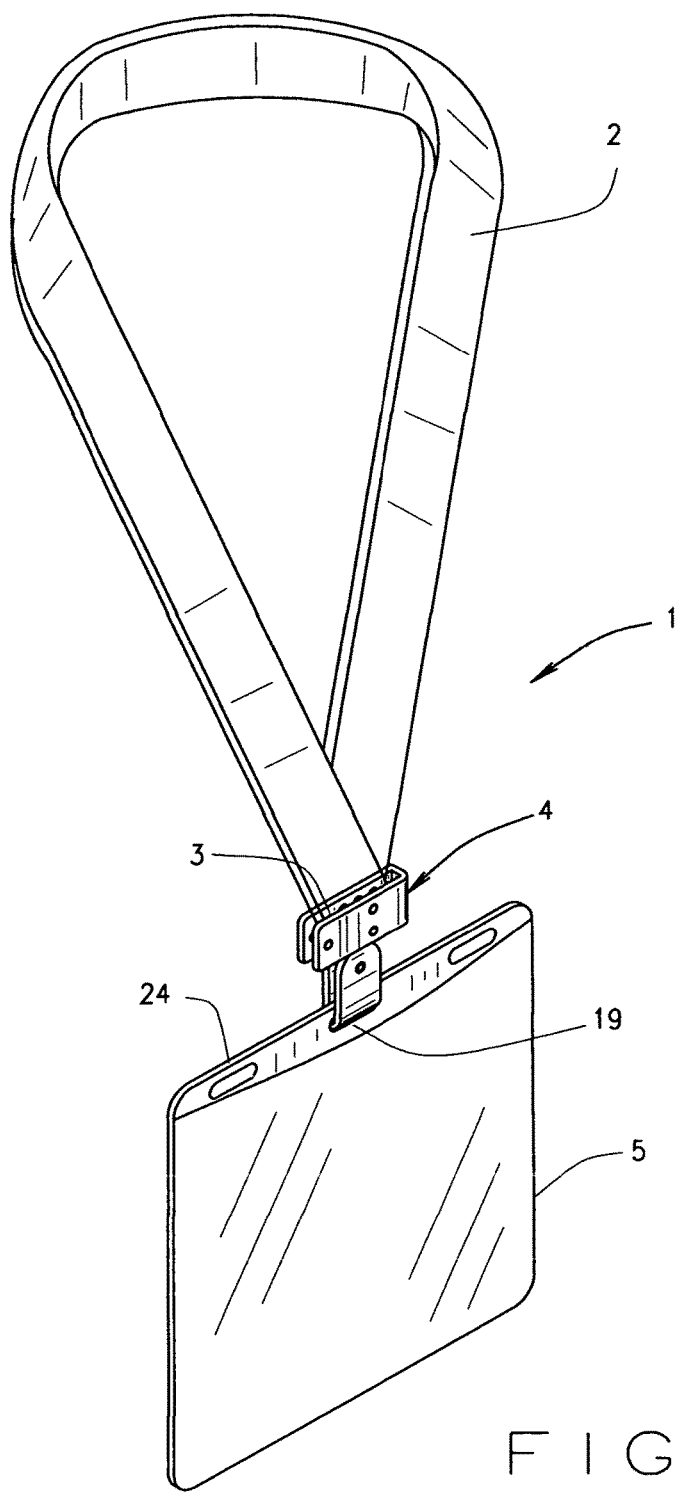
FIG. 1 shows the lanyard strap, link device, and the name tag holding envelope, all assembled into position in preparation for its usage when suspended about the neck of its wearer, while attending a meeting, convention, or other assembly.

In referring to the drawings, the concept of this invention is generally shown in FIG. 1, and comprises the lanyard strap and link or clip device for displaying the name and other indicia of a person temporarily about the body of a person, as can be noted at 1. It includes its lanyard 2, either the ends, as at 3, or just a portion of the strap, may be secured by the integral link 4 to the display envelope 5 the latter of which may be formed of any transparent, or near transparent, polymer, or other viewable material that may hold the name card, to that displays not only the personal name, title, and other indicia of the wearer. As can be noted, a part of the link 4 secures to the strap 2, while an integral portion secures through an opening at the proximate upper edge of the envelope 5, as can be noted.

Figure 2:
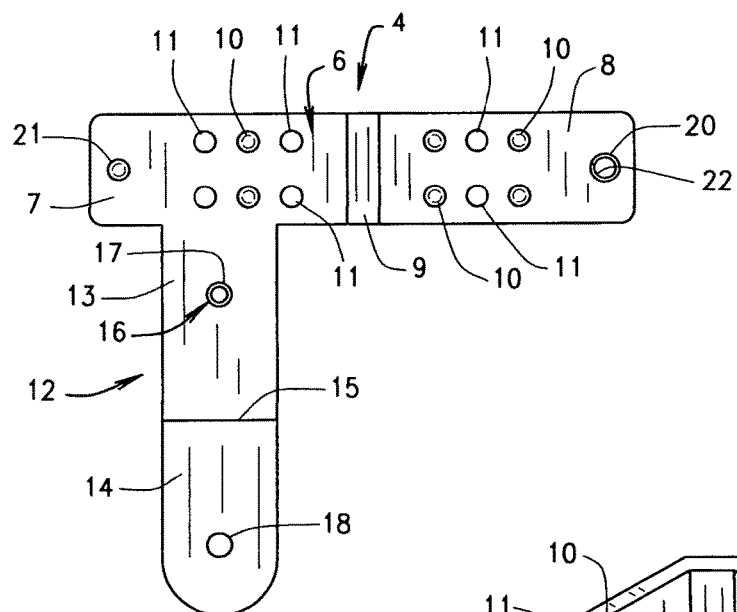
FIG. 2 shows a plan view of the integral link, formed of a lateral tab, and a vertical tab, molded from a thinly formed polymer, to form a one piece link that can be easily secured to its lanyard, and accompanying envelope, during assembly and in preparation for usage.
Figure 3:
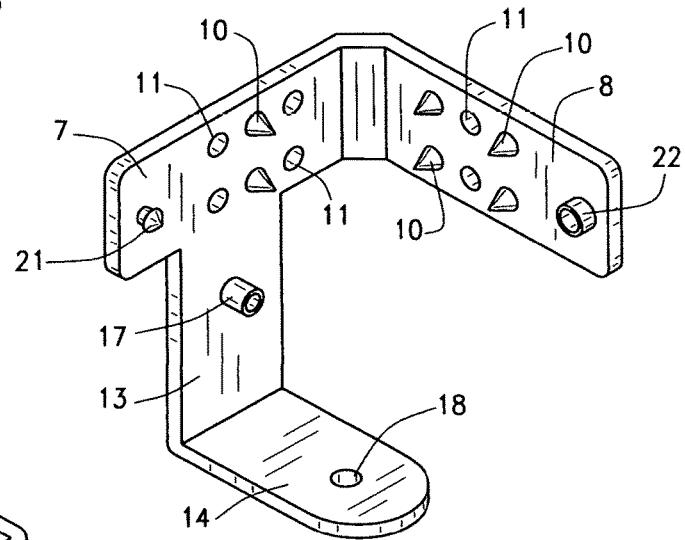
FIG. 3 shows the lateral tab of the link being partially folded into closure, during its assembly, and its integral vertical tab being partially folded into closure, after it will have been inserted through a slot of the envelope, as previously seen in FIG. 1.
Figure 4:
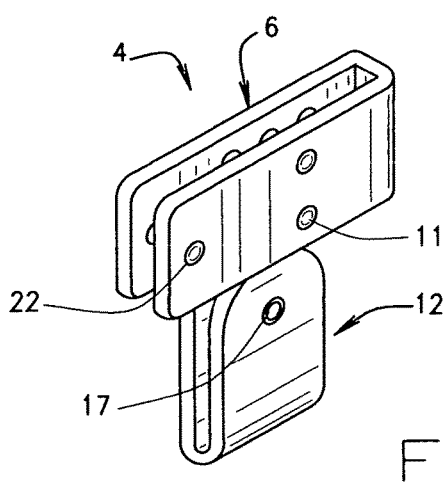
FIG. 4 shows the integral link with all of its various tabs folded into closure, for holding either the lanyard, as in the case of the lateral tab, or the holding of the envelope, through the folding of the vertical tab, as shown in this FIG. 4, and as further disclosed in said FIG. 1.

As can be seen, the link is formed as a clamp device 4, as can be seen in FIGS. 2 through 4, includes a lateral tab 6, which actually is formed of two halfs, a left half 7, and a right half 8 which are held together, integrally, through a living hinge 9 the latter providing a means for easily folding the lateral tab upon itself, when it is used to secure the lanyard strap at its ends, during assembly.

Projecting from the interior surface of the lateral strap are a series of teeth or probes, as at 10, that extend inwardly for a sufficient distance, generally as can be seen in FIG. 3, and these teeth are aligned with select apertures, as at 11, and into which the teeth 10 insert, when the right half 8 of the lateral tab is folded over, onto the left half side 7, so as to assure that the lanyard, or the lanyard ends, that are embraced therein, are secured by the teeth, as they extend into their aligned apertures, to assure that the strap is permanently secured, and will not come loose, during continuous usage.

Extending downwardly from the lateral tab 6 is a vertical tab 12, and it likewise is formed of approximately two integral halves, as at 13 and 14, and when these halves are folded about their living hinge 15, the fastener 16, formed of a male part 17, and a female part or aperture 18 are secured together, after the vertical tab has been inserted through the aperture 19 formed along the upper portion of the envelope 5, as can be noted.

A similar type of fastener 20, formed of a male part 21 and the female part or aperture 22 can be secured together to hold the lateral tab in place, when its one half is folded over and locked into engagement with the other half, upon securing the lanyard in place, during assembly.

Thus, as can be noted, the singular and integral link 4 can be conveniently folded over to provide for both its holding of the lanyard in place, in addition to its securement to the upper edge of the envelope, as can be noted, following its assembly and during usage as displayed in FIG. 1. Furthermore, in order to facilitate the ease of manipulation of the integral link, when clamping these various components together, it may be molded from a polymer, and need not have a thickness greater than between about 25 to 40 thousands of an inch, in its construction, and during its assembly and usage.

Furthermore, the link, and the entire device, can be fabricated of biodegradable materials. For example, the link may be formed of at least one of acetate, polyoxymethylene, polypropylene, polyethylene terephthalate (g), and polylactic acid, and any of these formulas having degradant attributes, for return to the environment, when disposed of.

Likewise, it is desirable to utilize an envelope that has been molded or formed from transparent and planar material, which may also be folded into its usable configuration, perhaps heat sealed along a few of its edges, to form the envelope, generally having an open upper edge, as at 24, as can be noted. The envelope may be formed of at least one of polylactide, polyvinyl chloride, polyethylene terephthalate (g) and polylactic acid, or polypropylene polymer, which likewise exhibits degradable attributes, particularly when disposed of.

Furthermore, the lanyard itself, which is generally elongated and flexible, and perhaps may have a pair of ends, and said lanyard can be formed of biodegradable cloth, or even a polymer such as one of polyoxymethylene and polypropylene, and includes a pro-degradant, to provide for degrading of the lanyard when also disposed of in the environment, after usage, so that its ingredients will likewise breakdown, over a period of time. Such biodegradable polymers may be obtained from ENSD Restore LPDE, of Hong Kong.

The foregoing are examples of the structure of the rather inexpensive badge holder of this particular invention, one that can be assembled and applied in situ, but yet furnish a full display of a person's name, and other information, that may be necessary when attending a meeting, or the like.

Variations or modifications to the subject matter of this invention may occur to those skilled in the art upon review of the summary of the invention as provided herein, and upon undertaken a study of the description of its preferred embodiment. Any variations, modifications, or improvements, even to the formulations described, particularly if within the spirit and scope of this invention, are intended to be encompassed within the scope of any claims to patent protection issuing hereon. The definition of the invention in the preferred embodiment, and its depiction in the drawings, are set forth for illustrative purposes only.

We claim:

1. A lanyard strap and link device for displaying the name and other indicia of a person temporarily about the body of a person, said device including said strap, securing with said link, and said link being secured with an envelope that is generally transparent and planar, and having an open edge into which the name and other indicia of a person may insert, and said link being secured through an aperture provided proximate the upper edge of the envelope for attachment;
    said lanyard generally elongated and flexible, and having two ends, said lanyard being formed of cloth, or a polymer, and useful for suspending the envelope upon a person during usage;
    said link formed as at least one clamp, said clamp comprising a one piece clamp, said clamp having an integral lateral tab extending to one side, and said integral lateral tab being foldable at approximate its midpoint, forming a left side tab and a right side tab, and said lateral tab being foldable about a fold line;
    an integral vertical tab connecting with one of the left side or right side of said lateral tab proximate a central portion thereof and extending downwardly therefrom, and said integral vertical tab having a fold line at its approximate center, to allow for the vertical tab to be folded into closure and secure the envelope in place during usage; and
said one piece clamp and its integral lateral tab and integral vertical tab being flexible and having a thickness between about 25 to 40 thousands of an inch, said lateral tab being foldable about its fold line along its center thereof, and having an integral fastener for securing the lateral tab into closure and securing the ends or the lanyard therein during assembly and usage, said integral vertical tab being foldable proximate its center along its length and having a second integral fastener for securing the folded vertical tab to the proximate edge of the said envelope during usage of the device.

2. The lanyard strap and link device of claim 1, wherein said clamp, and its lateral tab having an inner surface, and a series of teeth extending inwardly from said inner surface, to impail and secure the lanyard strap during usage.

3. The lanyard strap and link device of claim 2, wherein said inner surface of said lateral tab having a series of apertures aligned with the series of teeth to secure and grip the lanyard strap during assembly of said device.

4. The lanyard strap and link device of claim 1, wherein said lateral tab and said vertical tab each having a living hinge at approximate their centers to facilitate their folding during assembly and their securement to the lanyard and the envelope during usage.

5. The lanyard strap and link device of claim 1, wherein the lanyard, clamp, and envelope is formulated from biodegradable components.

6. A lanyard strap and link device for displaying the name and other indicia of a person temporarily about the body of a person, said device being a biodegradable badge holder formed of biopolymers, and comprising:
    an envelope, generally transparent and planar, and having at least one edge open upon the perimeter, being open upon at least one edge, and generally formed of at least one polypropylene polymer, polylactide, polyvinyl chloride, polyethylene terephthalate (g) and polylactic acid, and having degradant attributes for the envelope for return to the environment when disposed of;
    a lanyard, generally elongated and flexible, and having two ends, said lanyard formed of cloth, or one of polyoxymethylene and polypropylene, and includes a pro-degradant, to provide for degrading of the lanyard when disposed in the environment, said lanyard supporting said envelope upon a person;
    at least one link, said link comprising a one piece clamp, said clamp having an integral lateral tab extending to one side, and said clamp having an integral vertical tab connecting with the lateral tab proximate one side thereof, and extending downwardly therefrom, said clamp being formed of at least one of acetate, polyoxymethylene, polypropylene, polyethylene terephthalate (g), and polylactic acid, and having degradant attributes for return to the environment when disposed of;
    said one piece clamp and its integral lateral tab and integral vertical tab being flexible and having a thickness between about 25 thousands to 40 thousands of an inch, said lateral tab being foldable proximate its center along its length, and having an integral fastener for securing the lateral tab into closure, and thereby securing the ends of the lanyard therein during assembly and usage; and
    said integral vertical tab being foldable proximate its center along its length, and having another integral fastener for securing the folded vertical tab to the proximate upper edge of said envelope during usage of said device.

7. The lanyard strap and link device of claim 6, wherein said clamp, and its lateral tab having an inner surface, and a series of teeth extending inwardly from said inner surface to impail and secure the ends or the lanyard strap during assembly.

8. The lanyard strap and link device of claim 7, wherein said inner surface of said lateral tab having a series of apertures aligned with the series of integral teeth to assure a gripping of the lanyard strap during assembly of said device.

9. The lanyard strap and link device of claim 6, wherein said lateral tab and said vertical tab each having a living hinge to facilitate their folding into closure during assembly.

\* \* \* \* \*